March 4, 1958 F. W. HICKS, JR 2,825,362
CONTROL VALVE
Filed July 29, 1953 5 Sheets-Sheet 1
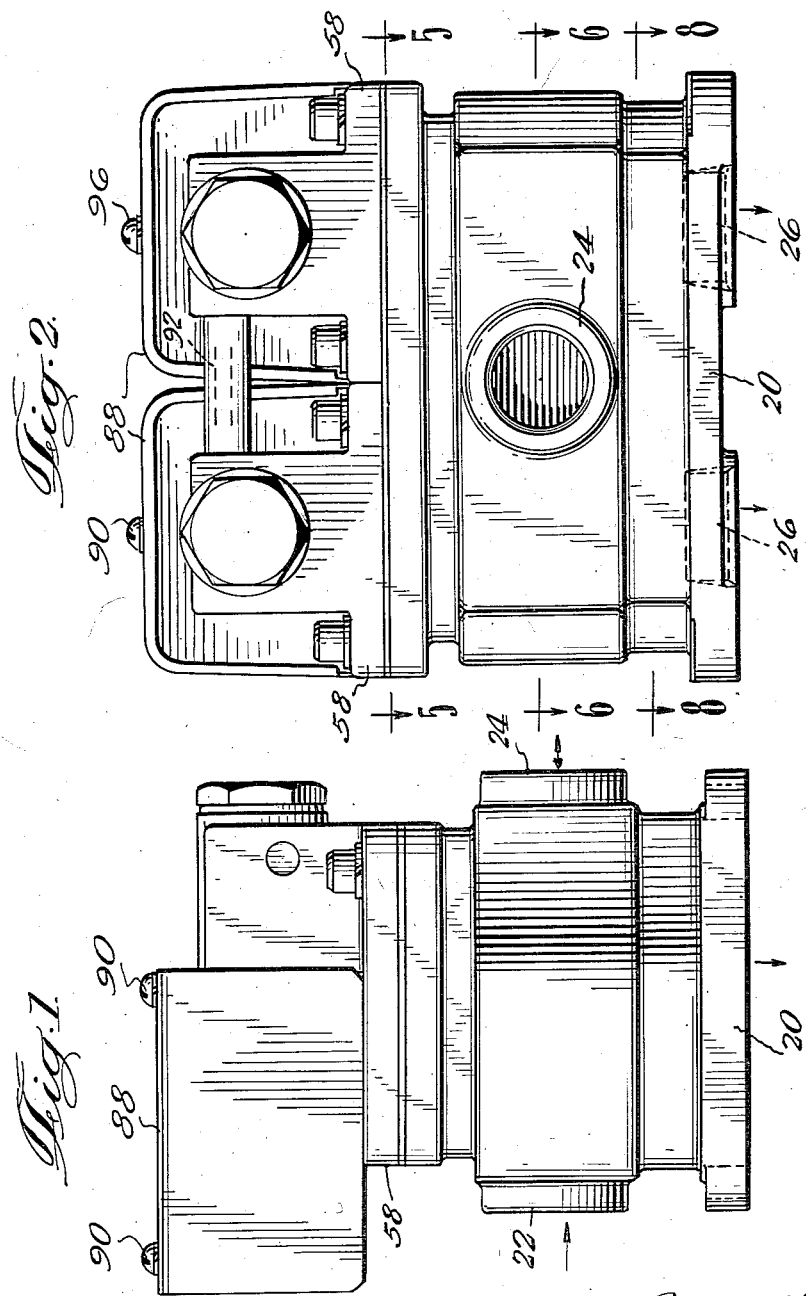
Inventor
Frederick W. Hicks, Jr.
By Mann, Brown & Hausmann
Attorneys March 4, 1958 F. W. HICKS, JR 2,825,362
CONTROL VALVE Filed July 29, 1953 5 Sheets-Sheet 2

Inventor
Frederick W. Hicks, Jr.
By Mann, Brown & Hausmann
Attorneys

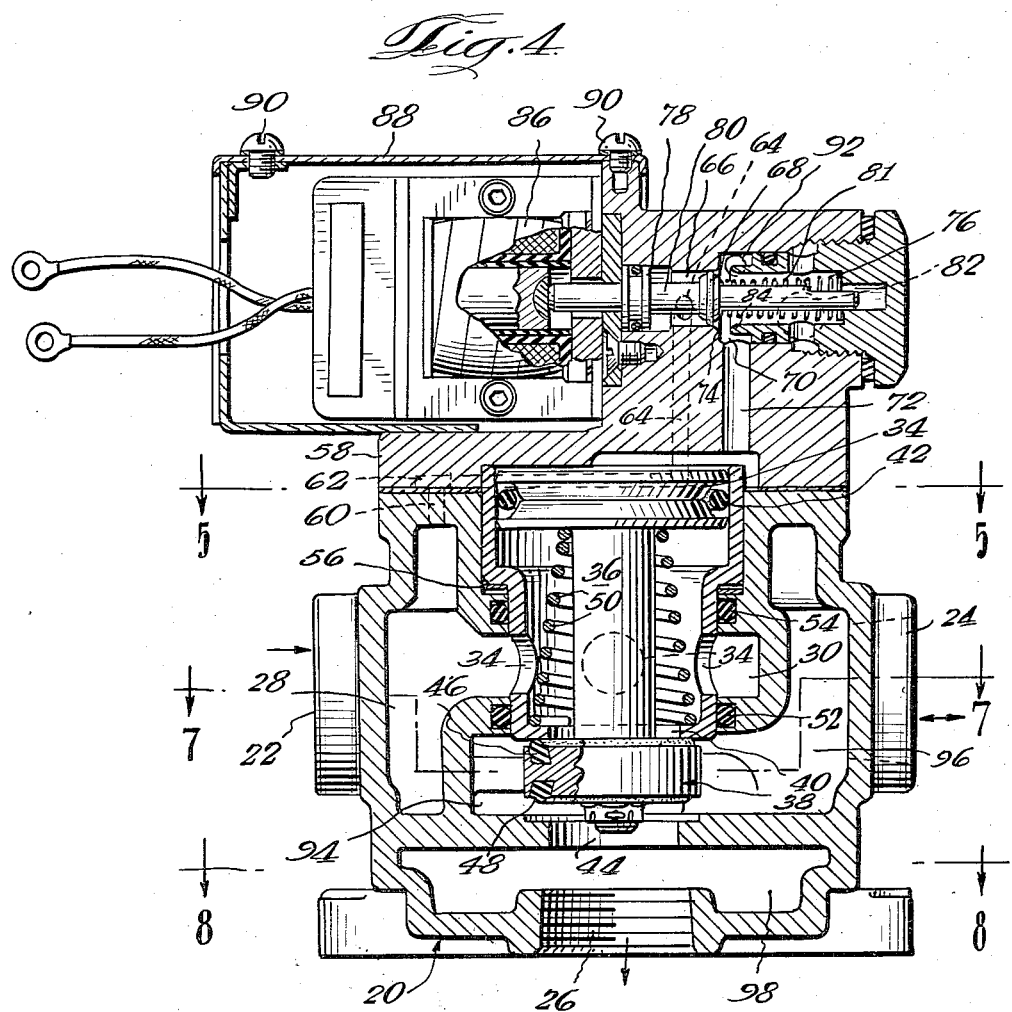

March 4, 1958 F. W. HICKS, JR 2,825,362
CONTROL VALVE
Filed July 29, 1953 5 Sheets-Sheet 4
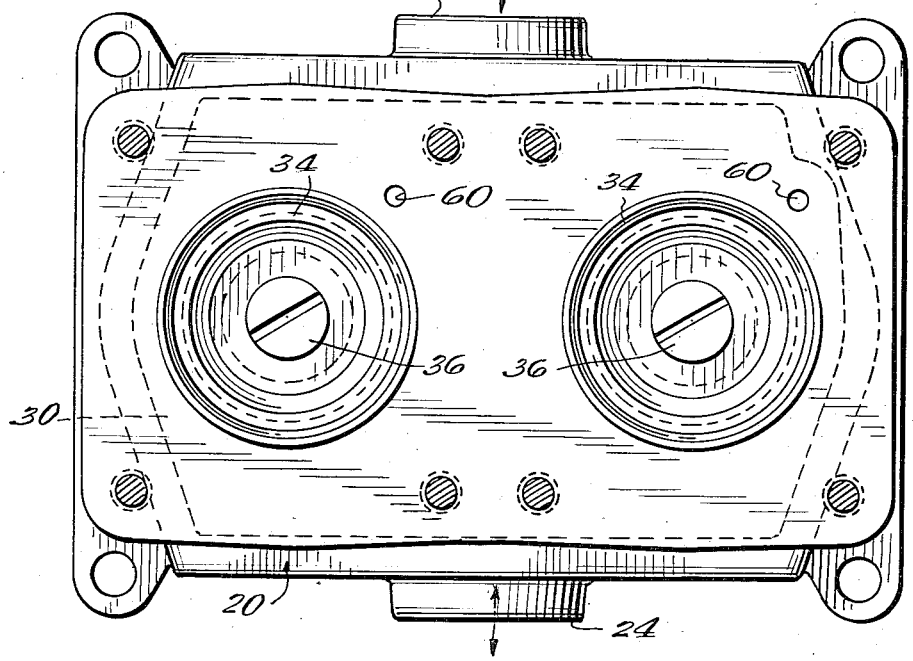
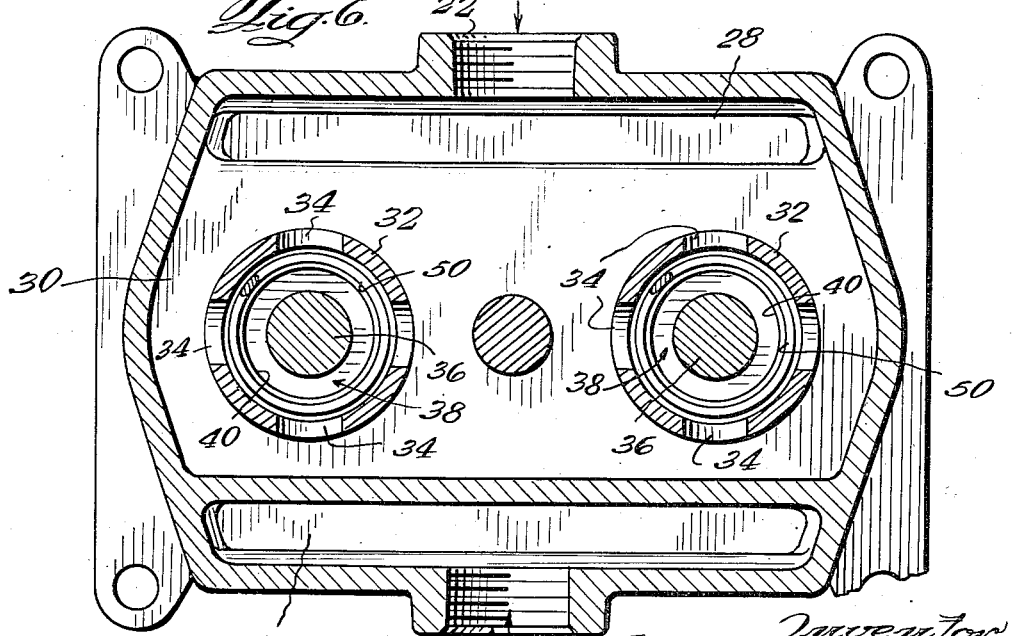
Inventor
Frederick W. Hicks, Jr.
By Mann, Brown & Hanson
Attorneys March 4, 1958     F. W. HICKS, JR     2,825,362
CONTROL VALVE
Filed July 29, 1953     5 Sheets-Sheet 5
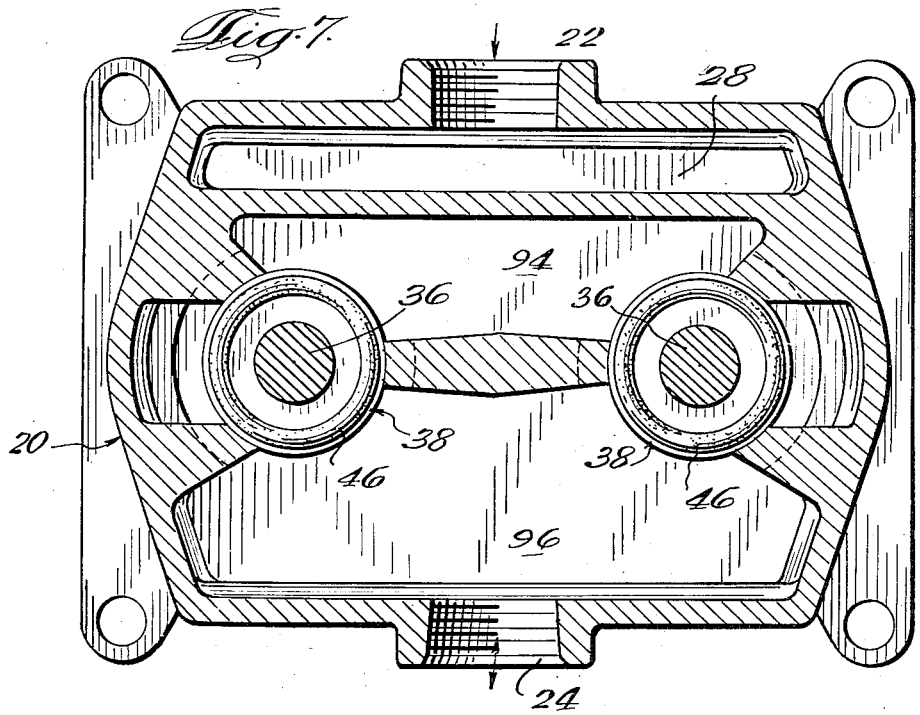
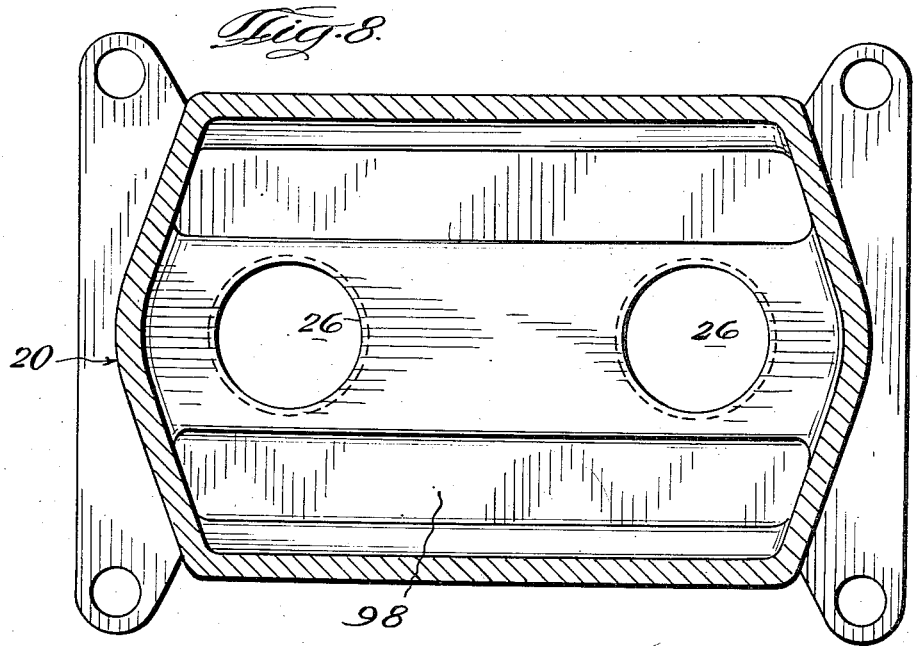

United States Patent Office 2,825,362
Patented Mar. 4, 1958

2,825,362

CONTROL VALVE

Frederick W. Hicks, Jr., Skokie, Ill., assignor to Hannifin Corporation, Chicago, Ill., a corporation of Illinois Application July 29, 1953, Serial No. 371,005

4 Claims. (Cl. 137—622)

My invention relates to control valves particularly adapted for, but not limited to, use in the air lines leading to air-operated clutches and brakes for mechanically driven power presses.

In presses for stamping automobile bodies and other similar purposes, it is customary to provide a continuously rotating source of power and intermittently to connect the movable head of the press with such source through an air-operated clutch. Brake mechanism is provided to stop the movable head as soon as the air-operated clutch is released. In some presses the clutch and brake mechanism are interconnected so that a single air control valve is utilized, whereas in other presses one control valve is provided for the clutch and another for the brake mechanism.

In the operation of such presses it is imperative that the press will not repeat in case of any failure of a control valve. If such repeat should occur it would likely result in injury or death to one or more men working about the press and damage to expensive dies or other equipment. While modern control valves rarely fail, even the remote possibility of such failure constitutes a serious hazard, and manufacturers and operators of such presses have long sought a control valve which, if it fails, will fail safe and prevent the press from repeating.

An object of my invention is to provide a control valve for such presses which, if it fails, will fail safe and prevent a repeat operation of the press.

Another object of my invention is to provide a control valve which is many times safer than existing control valves.

Another object of my invention is to provide a new and improved control valve which is relatively inexpensive to manufacture, easy to install, and capable of giving long and continuous service.

Another object of my invention is to provide a new and improved dual safety valve capbale of controlling power presses as well as being utilized for other general control purposes.

Other objects and advantages will become apparent as the description proceeds.

In the drawings:

Figure 1 is an end elevational view of a control valve embodying my invention;

Figure 2 is a side elevational view of the valve shown in Figure 1;

Figure 4 is a transverse sectional view taken in the vertical plane of the line 4—4 of Figure 3;

Figure 5 is a horizontal sectional view taken in the plane of the line 5—5 of Figure 2;

Figure 6 is a horizontal sectional view taken in the plane of the line 6—6 of Figure 2;

Figure 7 is an irregular sectional view taken on the planes of the line 7—7 of Figure 4; and Figure 8 is a horizontal sectional view taken on the plane of the line 8—8 of Figure 2.

Figure 3:
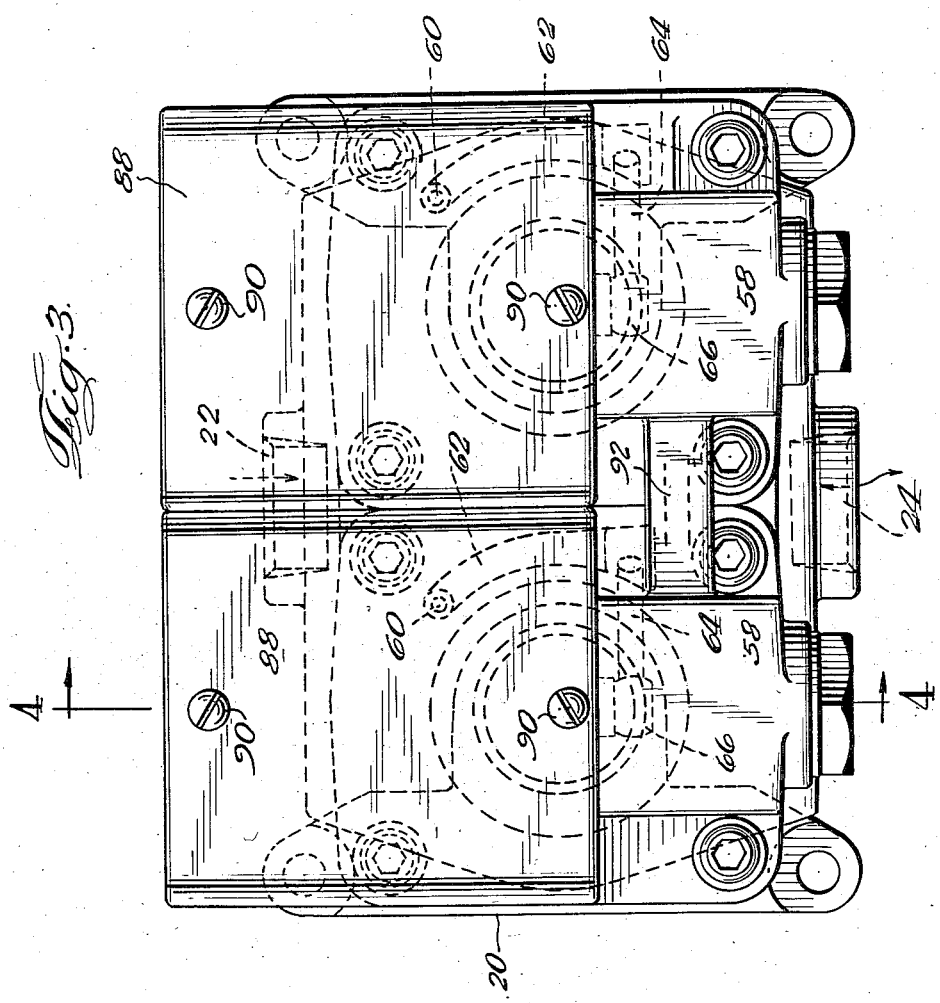
Figure 3 is a top plan view of the valve of Figures 1 and 2.

My novel valve comprises a body 20 having a single air inlet 22 located midway of one side thereof and a single outlet 24 adapted to be connected with a clutch, brake, or other operating mechanism. The inlet and outlet are in alignment with each other and are located on opposite sides of the valve body. The valve body is also provided with a pair of exhaust ports 26. In a typical embodiment of my invention the inlet 22 and outlet 24 are each threaded to receive a ¾" pipe, whereas each of the exhaust ports 26 is threaded to receive a 1" pipe.

The inlet 22 communicates directly with a longitudinal passage 28 which extends substantially the full length of the valve body, as best shown in Fig. 6. This passage 28 in turn communicates with a horizontal chamber 30 which completely surrounds a pair of cartridges 32. Each cartridge includes a main valve and operating mechanism therefor to be hereinafter more fully described. The wall of each cartridge 32 is shown as having four openings 34 communicating with the chamber 30 and providing free access to the interior of each cartridge for air entering through the inlet 22.

Each cartridge comprises a main piston 34 attached to the upper end of a piston rod 36 carrying a main valve 38 at its lower end. This main valve controls a port 40 formed by the inturned lower end of the cartridge shell. An O-ring 42 forms a seal for the main piston 34 and these parts may have the construction claimed in my co-pending application Serial No. 331,721, filed January 16, 1953, and now abandoned.

The main valve 38 also controls a second port 44 and is provided with rubber annuli 46 and 48 for cooperating with the valve seats adjacent the ports 40 and 44 respectively.

The piston 34 is larger than the portion of the valve 38 exposed by the port 40 so that air pressure in the interior of the cartridge tends to return the piston 34 to upper or valve closing position. This closing movement of the piston is also assisted by a spring 50.

A pair of O-ring seals 52 and 54 prevent leakage between each cartridge 32 and the adjacent portions of the valve body 20. A wave washer 56 is interposed between opposing shoulders of each cartridge 32 and the valve body 20. This washer 56 urges the upper end of its cartridge 32 into contact with one of the two pilot heads 58. The cartridge construction shown is of the kind claimed in my co-pending application Serial No. 333,921, filed January 29, 1953, now Patent No. 2,754,840, issued July 17, 1956, although it may be of any other suitable type.

Air is supplied to the upper side of each main piston 34 from the longitudinal passage 28 by a series of passages controlled by a pilot valve in a manner which I shall now describe.

Since the series of passages is the same for each main valve, it will suffice to describe one series of passages.

A vertical passage 60 is connected to the longitudinal passage 28 opposite each cartridge 32. This passage 60 in the specific embodiment heretofore referred to has a diameter of ⁹⁄₆₄" and constitutes a metering means for limiting the quantity of air supplied to the pilot valve chamber and upper side of the main piston 34.

The upper end of this passage 60 connects with one end of an arcuate passage 62 whose other end connects with an inclined passage 64 leading to a pilot inlet chamber 66.

The pilot valve 68 controls communication between the chamber 66 and an outlet chamber 70 which communicates by way of passage 72 with the top of the main piston 34.

In the position shown in Fig. 4, the pilot valve 68 is in engagement with a seat 74 and cuts off communication between the chambers 66 and 70. The pilot valve is normally held in this position by a spring 76 and by the differential air pressure acting upon the pilot valve 68 and the larger piston 78 attached to the pilot valve stem 80.

In the position shown the chamber 70 is in communication with an exhaust chamber 81 having an exhaust port 82 which may lead directly to atmosphere. The pilot valve is shifted from engagement with valve seat 74 and into engagement with valve seat 84 by energization of a solenoid 86 located in a sheet metal housing 88 attached to the pilot head by screws 90. The pilot valves and connections therefor are preferably of the kind claimed in my co-pending application Serial No. 331,870, filed January 19, 1953, and now abandoned, and Serial No. 333,921, filed January 29, 1953, now Patent No. 2,754,-840, issued July 17, 1956, although they may be of any other suitable construction.

A passage 92 interconnects the chambers 70 in the pilot valve heads for a purpose which I shall hereinafter describe. This passage 92 in the particular embodiment heretofore referred to has a diameter of 18/64" and the exhaust ports 82 each have a diameter of 22/64". It will be noted that these diameters are substantially greater than the 9/64" diameter of the metering passages or orifices 60.

The main valves 38 are located in a horizontal chamber 94 which is best shown in Figs. 4 and 7. This horizontal chamber 94 connects with a longitudinal passage 96 in direct communication with the outlet 24 leading to the mechanism to be operated. This is best shown in Figure 6.

In the position of the parts shown in Fig. 4, the chamber 94 is in open communication with an exhaust chamber 98 which in turn communicates directly with the two exhaust ports 26.

It will be noted from the foregoing that the passage 28 and chamber 34 are both large and give free access of air to the openings 34 in the cartridges 32 so that there is substantially no pressure drop between the inlet 22 and the interior of the cartridges 32. When the main valves 38 are moved to their lower or open positions, the two ports 40 each of which is 1 1/32" in diameter permit the air to flow freely into the large chamber 94 and thence through the large passage 96 to the outlet 24. Here also the construction is such as to eliminate substantially all resistance to air flow so that there is no appreciable pressure drop between the inlet 22 and outlet 24.

The two ports 44 are also each of 1 1/32" diameter and communicate with the large chamber 98 extending lengthwise of the valve body and in open communication with the two exhaust ports 26 each of which has an effective diameter of approximately 1.049". Since the inlet 22 and outlet 24 each has an effective diameter of approximately .824" it will be readily apparent that the exhaust ports and connections leading thereto can readily discharge without substantial back pressure any air entering either through the inlet 22 or outlet 24.

When the valve is at rest the parts are in the position shown in Fig. 4. In normal operation both solenoids are energized simultaneously and shift the pilot valves 68 from engagement with seats 74 into engagement with seats 84. This permits the air under pressure in chamber 66 to flow down passages 72 into contact with the upper sides of the main pistons 34 and push these pistons downwardly until the rubber annuli 48 on the valves 38 engage the seats surrounding ports 44 and seal off communication between these ports and the chamber 94. This permits air to flow from the inlet chamber 30 through ports 40 to the outlet chamber 94 and thence through passage 96 and outlet 24 to the clutch, brake, or other mechanism to be operated.

When the solenoids are deenergized the pilot valves 68 are returned to the position shown in Fig. 4 by the springs 76 and the air pressure acting on the pilot valve pistons 78. This cuts off the supply of air to the tops of the main pistons 34 and permits the air from above these pistons to exhaust to atmosphere through exhaust outlets 82. Thereupon main pistons 34 are returned to upper position by their springs 50 and the air pressure acting on the lower sides of the pistons.

This returns the main valves 38 to the position shown in Fig. 4 and connects outlet chamber 94 with exhaust chamber 98. This permits air in the line leading to the clutch, brake, or other operating mechanism to exhaust freely by way of outlet 24, longitudinal passage 96, chamber 94, ports 44, chamber 98, and exhaust ports 26.

In many installations where my novel valve is applied to a press, these exhaust ports 26 would simply be directed toward the body of the press and would exhaust directly to atmosphere without connecting the exhaust ports to any pipe whatsoever. In such installations the valve would be so high in the air that the exhaust noise would not be objectionable and would be bounced back by the body of the press. In other installations the two exhaust ports 26 may be connected to a muffler but the back pressure of such an exhaust system would be kept to a minimum and would not exceed two pounds per square inch. Such a pressure would not interfere in the least with the fail safe feature of my control valve, as hereinafter explained.

While I contemplate that my new and improved control valve will be carefully and accurately made of proper materials and should give many millions of operations without failure of any kind, there is always the possibility that any mechanical device will fail. An outstanding feature of my dual safety control valve lies in the fact that regardless of how or where the failure occurs, the valve will fail safe and prevent a repeat operation of the press or other operating mechanism which it controls. I shall now describe various conditions under which failure might possibly occur and point out the fail safe operation of the valve under each of these conditions.

If one pilot valve should open while the other stuck in closed position, the air delivered to the open pilot valve can go down to the head of the main piston, but because of no back pressure this air would not cause operation of the piston. The absence of back pressure is due to the fact that the air coming through this open pilot valve can freely escape by way of cross-passage 92 and exhaust outlet 82 in the other pilot head. As heretofore pointed out, the passage 60 leading to the pilot valve is smaller than any other passage leading to this valve and constitutes a control or metering orifice limiting the maximum volume of air which can be supplied to a pilot valve for any given air pressure at the main inlet 22. The relationship between the control passage 60, cross passage 92, and exhaust outlet 82 is 9/64 to 18/64 to 22/64 for their respective diameters so that any air passing through control passage 60 can readily escape to atmosphere without creating any appreciable pressure on the head of the piston 34.

From the foregoing it will be apparent that if one pilot valve should open and the other remain closed, neither main piston 34 will be operated and both of the main valves 38 will remain in the position shown in Fig. 4. In this position the main valves 38 cut off communication between the inlet 22 and the outlet 24 leading to the operating mechanism so that no operation of this mechanism is effected and there can be no repeat of a press or other device.

If both pilots operate and one of the main pistons sticks in its upper position and the other main piston operates, one of the main valves 38 would remain in the position shown in Fig. 4, whereas the other main valve 38 would move to close port 44 and open communication between the inlet 22 and outlet 24 so that air entering the inlet is in communication with the operating mechanism connected to the outlet 24. However, the outlet chamber 94 is in open communication with the exhaust chamber 98 by way of the port 44 whose main valve and main piston remain in the upper position. This port 44 is 1 1/32" in diameter and is larger than the inlet 22 which has an effective diameter of approximately .824". From exhaust chamber 98 the air can exhaust to atmosphere freely through the two exhaust ports 26, each of which has an effective diameter of approximately 1.49".

From the foregoing paragraph it will be apparent that any air entering the inlet 22 can escape freely to atmosphere since the passages, chambers and ports in the valve body which connect the inlet with atmosphere offer no appreciable resistance to escape of air and create no back pressure in the valve. The air in the line connecting the outlet 24 with the operating mechanism is therefore under no appreciable pressure and cannot actuate such mechanism. In other words, a failure of this particular type is also a safe failure which would prevent repeat operation of a press or other mechanism.

If one of the main pistons should stick at the bottom of its stroke and fail to return when its solenoid is deenergized, the situation would be substantially the same as in the immediately preceding type of failure. Air entering the inlet 22 and flowing into the outlet chamber 94 by way of the open port 40 of the stuck valve could escape freely to the exhaust chamber 98 by way of port 44 of the main valve which had returned, and from exhaust chamber 98 the air could escape freely to atmosphere through exhaust ports 26. Here again there would be no pressure on the air in the line leading from the outlet 24 to the operating mechanism, and no actuation of such mechanism could occur.

In all of the foregoing possibilities of failure, my dual safety control valve failed safe and made impossible any repeat operation. This is due to the unique design and construction of my valve which eliminates back pressure and provides built-in control orifices. Thus, where a pilot fails, a control passage 60 limits the flow of air to the remaining pilot valve and the larger exhaust passages and port permit this air to escape freely so that no back pressure is produced. Likewise, where a main valve sticks in either open or closed position, the inlet 22 constitutes a metering or control orifice and the passages, chambers and ports in the valve between the inlet and exhaust have a capacity greatly in excess of the inlet in order to eliminate any back pressure in the valve itself.

If the electrical system connected to the solenoids of the pilot valves, or if the air pressure should fail completely while the valve is operating, the main pistons and valves would simply return to closed or rest position and cut off communication between the inlet 22 and the outlet 24. Where a press is operating and a failure of this kind occurs on the operative stroke of the press, the press will simply stop and the clutch disengage without doing any harm. Similarly, a failure of the valve itself due to sticking of a pilot or sticking of a main valve in either open or closed position would not result in damage to the press and would not permit repeat operation thereof.

The pilot valves 68 and their pistons 78 are so constructed that the differential area insures return of the pilot valves to closed positions when the solenoids are deenergized. The springs 76 are provided solely for the purpose of preventing the pilot valve from being left in the open position as the result of vibration of the press at the time the air is cut off. If this should happen and no springs were provided, and the air pressure should build up gradually, air pressure might affect the main pistons 34 and cause the press to drift down before the air pressure was sufficient to close the pilot valves.

The springs 50 for the main piston 34 and valve 36 are also provided to prevent vibration of the press from shaking the main piston and valve to an open position as the air supply to the control valve is cut off, for example, when the press is shut down for the night or for repairs.

While I have referred to a specific embodiment as having ports and passages of particular dimensions, it is not my intention that my control valve be limited to such dimensions. Instead, I contemplate that my control valve will be made in various sizes for different operating mechanisms and different conditions of operation thereof.

It is also to be understood that my new and improved valve is not limited to the use of two cartridges in parallel and two pilot mechanisms in parallel as shown in the drawings. Any number of parallel cartridges and any number of parallel pilot mechanisms may be used, as desired.

An important feature of my invention lies in the fact that the safety feature is accomplished without the necessity of using special mechanisms therefor and is accomplished solely through the selection of appropriate sized orifices for controlling the flow of air in the main valve body and pilot mechanisms.

It will be understood that my invention is not limited to the particular construction shown and described but includes all variations, modifications and equivalents coming within the scope of the appended claims.

I claim:

1. A control valve of the class described comprising an elongated body having a single inlet at one side thereof, said inlet adapted to be connected to a source of air under pressure, a longitudinal passage communicating directly with said inlet, a horizontal inlet chamber communicating directly with said passage, a horizontal outlet chamber and a pair of ports arranged side by side and connecting said chambers, each of said ports having a diameter greater than the effective diameter of said inlet, a single outlet opposite said inlet, said outlet adapted to be connected to operating mechanism, a longitudinal passage connecting said outlet chamber with said outlet, a horizontal exhaust chamber, a pair of ports connecting said exhaust chamber with said outlet chamber, said last-named ports being in alignment with and having the same size as said first-named ports, and a pair of exhaust ports connecting said exhaust chamber with the exterior of said body, each of said exhaust ports being of a diameter greater than the effective diameter of said inlet, a pair of cartridges located in said body, each cartridge having inlets communicating with said horizontal inlet chamber, the inlets for each cartridge having a total area greater than that of said body inlet, a piston for each cartridge located above said cartridge inlets, a main valve for each cartridge located below said cartridge inlets and movable between and controlling a port in each of said first two pairs of ports, a stem connecting each piston with its valve, said pistons being of greater area than said valves whereby air entering the inlets of said cartridges tends to move said pistons and valves in one direction, said passages and chambers having greater flow capacity than said body inlet and outlet and cooperating with said ports to eliminate back pressure in said valve body, a pair of pilot heads attached to said body, each head having an inlet chamber, an outlet chamber, an exhaust chamber, valve seats between said chambers, and an exhaust port for the exhaust chamber, said body and heads providing a passage connecting the inlet chamber of each head with said first-named longitudinal passage, each of said connecting passages having a portion constituting a metering orifice for controlling maximum flow of air to its pilot inlet chamber, a pilot valve in each head controlling communictions between the three chambers therein, a large pilot piston in each pilot inlet chamber for moving its pilot valve in one direction, respective solenoids for moving said pilot valves simultaneously in the opposite direction, said pilot heads having respective passages connecting said outlet chambers with said main pistons for simultaneous actuation thereof in the same direction, means providing a passageway connecting the outlet chambers of said pilot heads, the ports connecting the three chambers in each pilot head and the passage connecting the pilot outlet chambers and the exhaust outlets for the pilot exhaust chambers each having a diameter greater than that of said metering orifice whereby back pressure in said pilot heads is eliminated, and springs for aiding air pressure in moving said pilot valves and main valves in one direction.

2. A control valve of the class described comprising a body having a single inlet port at one side thereof, said inlet adapted to be connected to a source of air under pressure, a longitudinal passage communicating directly with said port, a horizontal inlet chamber communicating directly with said passage, a horizontal outlet chamber and a pair of ports arranged side by side and connecting said chambers, each of said ports having a diameter greater than the effective diameter of said inlet, an outlet opposite said inlet, a longitudinal passage connecting said outlet chamber with said outlet, a horizontal exhaust chamber, a pair of ports connecting said exhaust chamber with said outlet chamber, said last-named ports being in alignment with said first-named ports, and a pair of exhaust ports connecting said exhaust chamber with the exterior of said body, each of said exhaust ports being of a diameter greater than the effective diameter of said inlet, a pair of cartridges located in said body, each cartridge having inlets communicating with said horizontal inlet chamber, the inlets for each cartridge having a total area greater than that of said body inlet, a piston for each cartridge, a main valve for each cartridge movable between and controlling a port in each of said first two pairs of ports, a stem connecting each piston with its valve, said pistons being of greater area than said valves whereby air entering the inlets of said cartridges tends to move said pistons and valves in one direction, said passages and chambers having greater flow capacity than said body inlet and cooperating with said ports to eliminate back pressure in said valve body, a pair of pilot heads attached to said body, each head having an inlet chamber, an outlet chamber, an exhaust chamber, valve seats between said chambers, and an exhaust port for its exhaust chamber, said body and heads providing a passage connecting the inlet chamber of each head with said first-named longitudinal passage, each of said connecting passages having a portion constituting a metering orifice for controlling maximum flow of air to its pilot inlet chamber, a pilot valve in each head controlling communications between the three chambers therein, respective large pilot pistons in said pilot inlet chambers for moving said pilot valves in one direction, respective solenoids for simultaneously moving said pilot valves in the opposite direction, said pilot heads having respective passages connecting said outlet chambers with said main pistons for simultaneous actuation thereof in the same direction, and means providing a passageway connecting the outlet chambers of said pilot heads, the ports connecting the three chambers in each pilot head and the passage connecting the pilot outlet chambers and the exhaust outlets for the pilot exhaust chambers each having a diameter greater than that of said metering orifice whereby back pressure in said pilot heads is eliminated.

3. A control valve of the class described comprising a body having an inlet at one side thereof and adapted to be connected to a source of air under pressure, a longitudinal passage communicating directly with said inlet, a horizontal inlet chamber communicating directly with said passage, a horizontal outlet chamber, two ports arranged side by side and connecting said chambers, each of said ports having a diameter greater than the effective diameter of said inlet, an outlet for connection to operating mechanism, a longitudinal passage connecting said outlet chamber with said outlet, a horizontal exhaust chamber, a pair of ports connecting said exhaust chamber with said outlet chamber, said last-named ports being in alignment with and having the same size as said first-named ports, a pair of exhaust ports connecting said exhaust chamber with the exterior of said body, each of said exhaust ports being of a diameter greater than the effective diameter of said inlet, a pair of cartridges located in said body, each cartridge having inlets communicating with said horizontal inlet chamber, the inlets for each cartridge having a total area greater than that of said body inlet, a piston for each cartridge located at one side of said cartridge inlets, a main valve for each cartridge located on the other side of said cartridge inlets and movable between and controlling a port in each of said first two pairs of ports, a stem connecting each piston with its valve, said pistons being of greater area than said valves whereby air entering the inlets of said cartridges tends to move said pistons and valves in one direction, said passages and chambers having greater flow capacity than said body inlet and outlet and cooperating with said ports to eliminate back pressure in said valve body, and a pair of pilot valves attached to said body to effect simultaneous operation of said pistons in the same direction.

4. A control valve of the class described comprising a body having an inlet at one side thereof and adapted to be connected to a source of air under pressure, a passage communicating directly with said inlet, an inlet chamber communicating directly with said passage, an outlet chamber, two ports arranged side by side and connecting said chambers, an outlet for connection to operating mechanism, a passage connecting said outlet chamber with said outlet, an exhaust chamber, a pair of ports connecting said exhaust chamber with said outlet chamber, said last-named ports being in alignment with said first-named ports, each of said ports having a diameter greater than the effective diameter of said inlet, exhaust passage means connecting said exhaust chamber with the exterior of said body, said exhaust passage means being of a size substantially greater than the effective diameter of said inlet, a pair of cartridges located in said body, each cartridge having inlets communicating with said inlet chamber, the inlets for each cartridge having a total area greater than that of said body inlet, a piston in each cartridge located at one side of said cartridge inlets, a main valve for each cartridge located on the other side of said cartridge inlets and movable between and controlling a port of each of said first two pairs of ports, a stem connecting each piston with its valve, said pistons being of greater area than said valves whereby air entering the inlets of said cartridges tends to move said pistons and valves in one direction, said passages and chambers having greater flow capacity than said body inlet and cooperating with said ports to eliminate back pressure in said valve body, and a pair of pilot valves attached to said body to effect simultaneous operation of said pistons in the same direction.

References Cited in the file of this patent

UNITED STATES PATENTS

| 410,180 | Ongley | Sept. 3, 1889 |
| 412,327 | Gibson | Oct. 8, 1889 |
| 2,617,444 | Gardner | Nov. 11, 1952 |
| 2,636,581 | Bitler | Apr. 28, 1953 |